Feb. 28, 1961     I. M. DAVIDSON     2,973,165
AIRCRAFT WITH JET ENGINES IN WINGS
Filed Jan. 22, 1958     6 Sheets-Sheet 1

Inventor

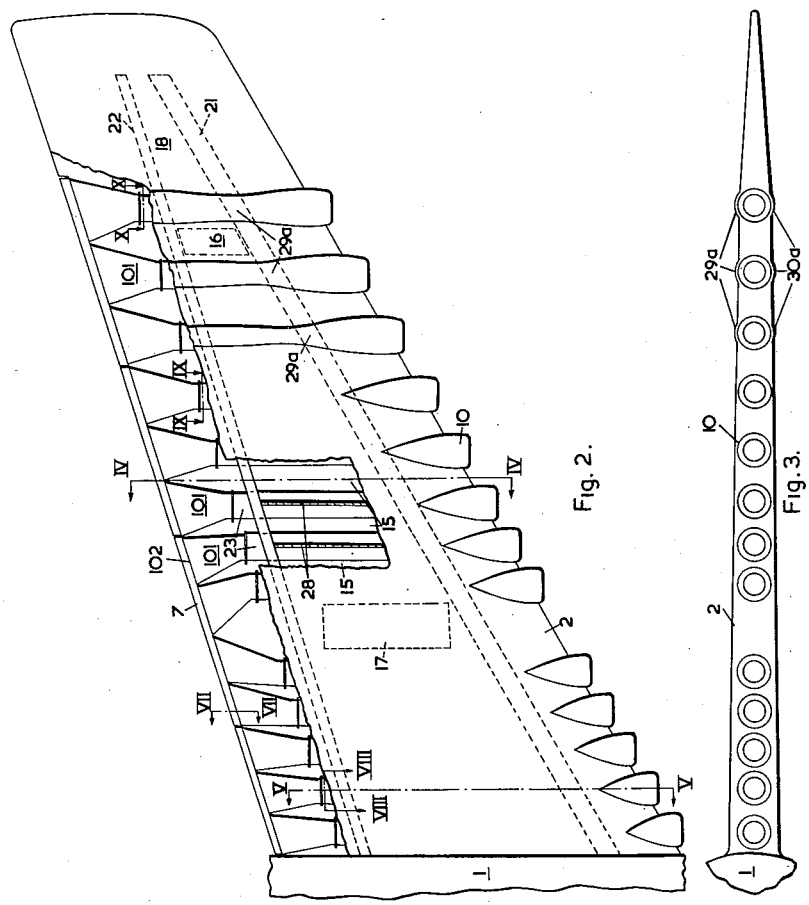

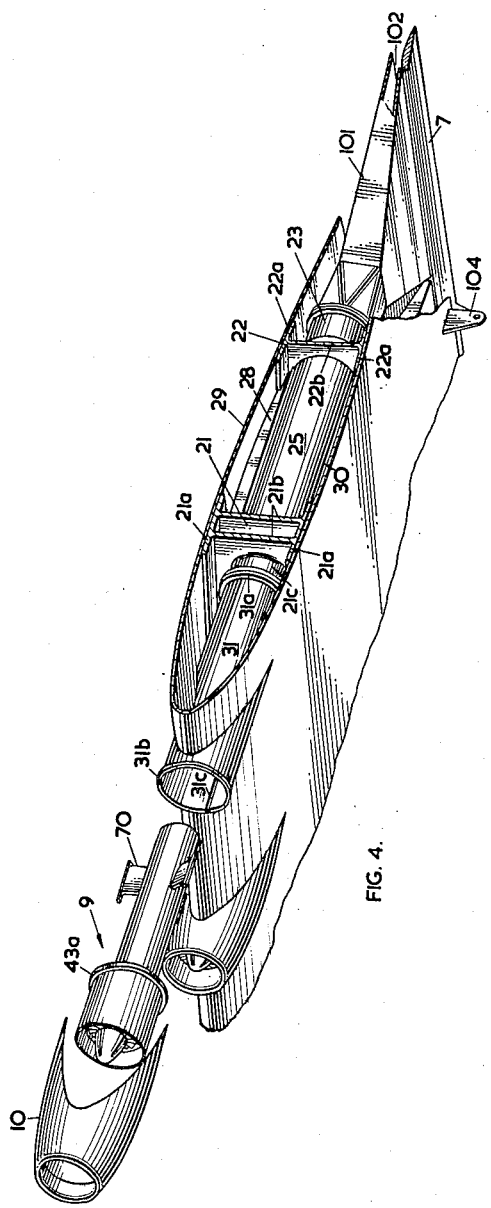

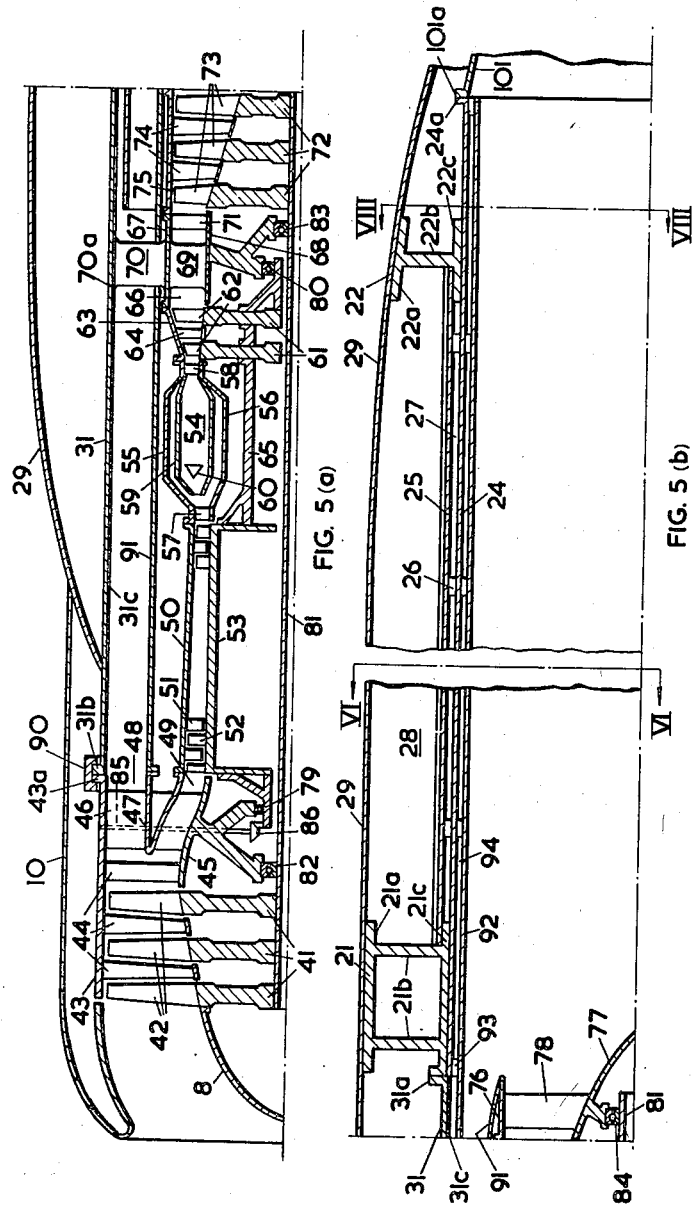

Feb. 28, 1961 I. M. DAVIDSON 2,973,165
AIRCRAFT WITH JET ENGINES IN WINGS
Filed Jan. 22, 1958 6 Sheets-Sheet 5

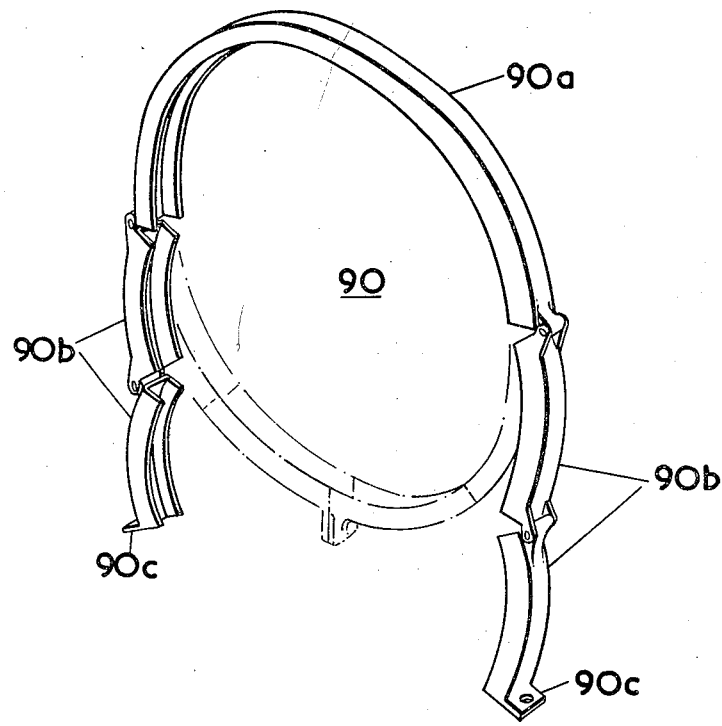
FIG. II.

United States Patent Office 2,973,165
Patented Feb. 28, 1961

2,973,165

AIRCRAFT WITH JET ENGINES IN WINGS

Ivor Macaulay Davidson, Farnborough, England, assignor to Power Jets (Research and Development) Limited, London, England, a British company Filed Jan. 22, 1958, Ser. No. 710,575

Claims priority, application Great Britain Feb. 4, 1957

12 Claims. (Cl. 244—15)

This invention relates to aircraft, and particularly though not necessarily exclusively to aircraft operating on the "jet flap" principle. Examples of jet flap aircraft are described in British Patents Nos. 787,011–5, 790,-193–4 and 790,298, and the principles involved are discussed in a paper by the present inventor published in the Journal of the Royal Aeronautical Society, January 1956.

It has been proposed that a jet flap aircraft should be powered by a large number of comparatively small wing-mounted jet engines arranged to discharge jet streams in the form of a long thin sheet. Some difficulty may however be encountered in finding room in the wing structure for the engines and the associated ducting while providing the necessary stress-carrying members for the wing, and this difficulty is accentuated if the jet pipes are at a high temperature and fuel is to be carried in the wing.

Earlier proposals for mounting jet engines in the wing of a jet flap aircraft are described in the above-mentioned British Patents Nos. 787,012–5 and the present invention in some aspects provides an alternative to the arrangements of these specifications.

According to the present invention, there is provided an aircraft wing comprising stress-carrying structure including a front spar and a rear spar extending spanwise of the wing and a plurality of straight cylindrical tubular members arranged side by side along the wing span and extending chordwise of the wing from a position forward of the front spar through the spars to which they are rigidly attached to a position rearward of the rear spar, the tubular members being connected at their rearward ends to rearwardly directed jet nozzles and further comprising at least one jet engine mounted forwardly of the front spar and connected to discharge a propulsive jet stream through the tubular members and jet nozzles.

According to one feature of the invention, fuel is carried in the wing in the space between two adjacent tubular members.

According to a further important feature of the invention, there is a jet engine for each tubular member releasably connected to the forward end thereof. Preferably each engine is a gas turbine jet propulsion engine of the by-pass type and includes a stator casing enclosing the by-pass compressor and axially abutting with and releasably connected to the forward end of the tubular member, the high pressure compressor, combustion system and turbine assembly being enclosed by a further casing extending co-axially within the tubular member.

In the case of a jet flap aircraft, the jet nozzles are shaped and directed so that the jet streams from the engines are discharged as a long thin jet sheet extending spanwise of the wing, and a jet deflector is provided for deflecting the jet sheet downwardly from the rearward direction.

The invention further provides an aircraft having a pair of wings as aforesaid.

A specific embodiment of the invention will now be described by way of example with reference to the accompanying diagrammatic drawings, of which:

Figure 2 is a schematic plan view of one wing of the aircraft, part of the upper surface being shown as broken away to reveal the interior construction.

Figure 3 is a front elevation of the wing.

Figure 4 is a fragmentary exploded perspective view of the wing which is shown as broken off along the line IV—IV in Figure 2 to reveal the interior construction.

Figure 5(a) and 5(b) together constitute a sectional view taken chordwise through the wing along the line V—V in Figure 2.

Figure 6:
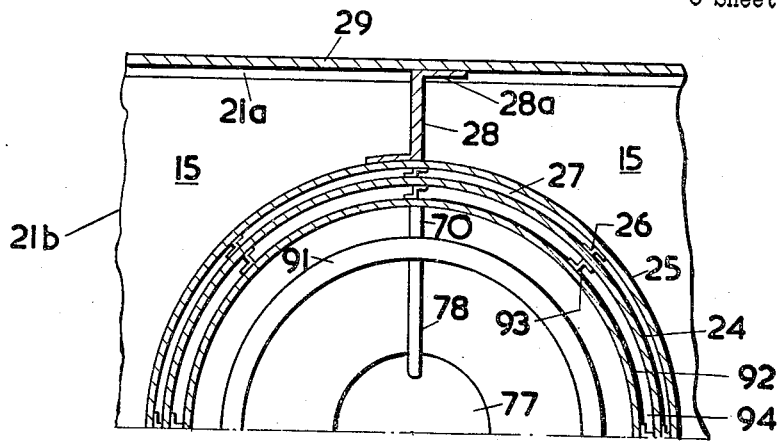

Figure 6 is a transverse half-section taken on the line VI—VI in Figure 5(b).

Figure 7:
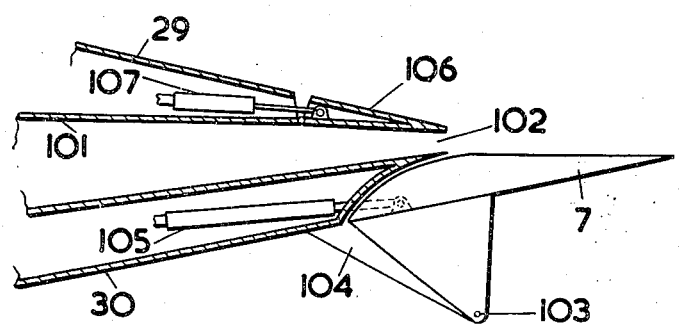

Figure 7 is a chordwise sectional view of the rearward part of the wing on the line VII—VII in Figure 2.

Figures 8, 9, 10:
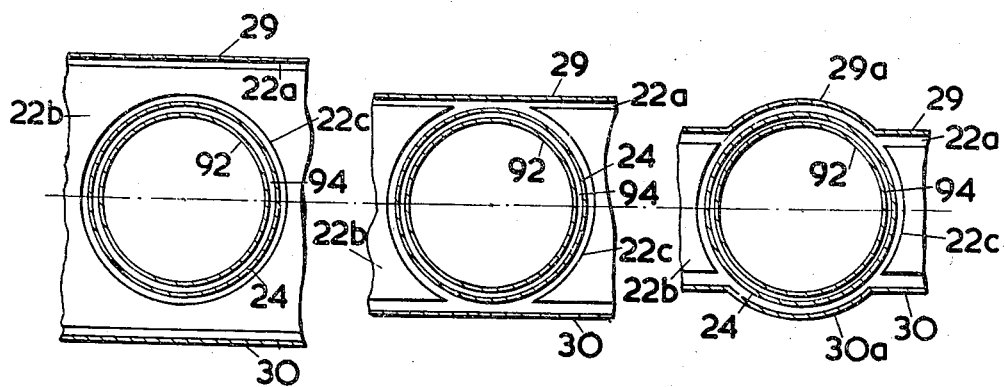

Figure 8 is a transverse section on the line VIII—VIII in Figures 2 and 5(b) on a somewhat smaller scale than Figures 5(a), 5(b) and 6.

Figures 9 and 10 are transverse sections similar to that of Figure 8 taken on the lines IX—IX and X—X in Figure 2.

Figure 11 is a perspective view of a component of Figure 5(a).

Figure 1:
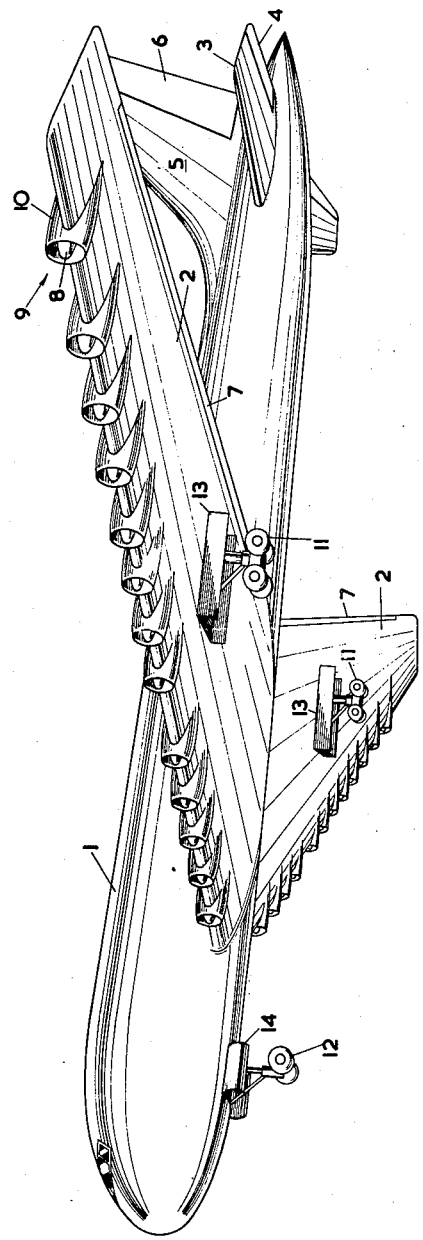
Figure 1 is a general perspective view of an aircraft.

As shown in Figure 1, the aircraft comprises a fuselage 1, a pair of swept-back wings 2 tapered in chord and thickness towards the wing tips, a tailplane 3 having elevators 4, and a fin 5 and rudder 6. Each wing has a small trailing edge wing flap 7 extending along a major part of its span from the root end as will be explained more fully below. The aircraft is powered by a large number of identical gas turbine jet propulsion engines 9 of the by-pass type distributed along the wing span and enclosed in part by nacelles 10. In this particular embodiment there are twenty-six such engines, thirteen in each wing, but there may of course be a greater or lesser number. The aircraft landing gear comprises main undercarriage units 11 mounted in the wings and a nose wheel unit 12 mounted in the fuselage the units being extendable to lowered positions as shown through openings which can be closed by doors 13, 14 when the undercarriage is retracted.

The stress-carrying structure of each wing includes front and rear main spars 21, 22 (see Figs. 2, 4, 5(a) and 5(b)) extending spanwise of the wing. These spars may be of any known construction but in the present example, the front spar 21 is of box-girder construction having upper and lower flanges 21a and two vertical webs 21b while the rear spar 22 is a simple girder with upper and lower flanges 22a and a single web 22b. For simplicity the spars are shown as being of integral construction but they may in practice be built up in known manner. The wing structure further includes thirteen straight cylindrical tubular members 23 (see Figures 2 and 4) extending chordwise of the wing and arranged parallel to one another and side by side along the wing span, all the tubes being of the same constant internal diameter throughout their lengths. As best shown in Figure 4 each tubular member 23 extends from a position forward of the wing leading edge, through the webs 21b, 22b, of the spars, to which it is rigidly attached as will be more fully explained below, to a position to the rear of the rear spar 22.

The construction of one of the tubular members 23 is shown in greater detail in Figures 5(a), 5(b), 6 and 8. It comprises a straight cylindrical tube 24 supported in sleeves 21c, 22c let into and integral with or rigidly attached to the webs 21b, 22b of the spars 21, 22, the tube 24 being rigidly secured in position in the sleeves e.g. by welding. Between the two spars the tubular member is double-walled, the tube 24 being enclosed by an outer sleeve 25 fitting over the sleeves 21c, 22c at its ends. The tube 24 and sleeve 25 are connected by spacers 26 welded thereto and define an annular space 27. Vertically and chordwise extending fins 28 are attached, e.g. by welding, to the outer surface of the sleeve 25 and these extend between the spars 21, 22 and have at their edges flanges 28a conforming to the wing profile. The tubular member, i.e., the tube 24 and its sleeve 25, and the fins 28 thus constitute one of the ribs of the wing, and the upper and lower skins 29, 30 of the wing are rigidly attached to the flanges 28a of the ribs and to the flanges 21a, 22a of the spars.

The above-mentioned fins 28 will only be required for the more inboard tubular members where their external diameter is less than the wing thickness and they are accordingly entirely buried in the wing as shown in Figure 4. At some intermediate position along the wing—at the tenth tube from the fuselage as shown in Figure 3, the tubular member will occupy the whole wing depth and the sleeves 21c, 22c of the spars will merge with the flanges 21a, 22a as shown in Figure 9. In the case of the three outboard tubular members it is necessary to bulge the spar flanges outwardly and to provide external fairings as indicated at 29a, 30a in Figures 2, 3 and 10. In the case of the four outboard tubular members the sleeve 25 is omitted. The tubular members are otherwise identical except for the reduction in length to allow for the tapering chord of the wing.

The forward part of each tubular member is constituted by a cylindrical extension tube 31 which is of the same internal diameter as the tube 24 and has at its rearward end an external flange 31a bolted or otherwise secured to a corresponding flange on the sleeve 21a. The extension also has an external flange 31b at its forward end to which is releasably connected a corresponding flange 43a on one of the by-pass gas turbine jet engines 9, which when installed in the aircraft lies partly ahead of and partly co-axially within the extension 31 and discharges its jet steam through the tubular member as explained below. The extension is of somewhat greater thickness than the tube 24 as it has to support the weight of the engine 9 and also to accommodate internal axially extending grooves 31c as will appear below.

The fins 28 may be continued forwardly of the spar 21 and be attached to and run out into the extensions 31 to conform to the wing profile.

Each engine 9 comprises a low pressure or by-pass compressor, a high pressure compressor, a combustion system, and a turbine assembly including a high pressure turbine and low pressure turbine, arranged coaxially in that order from front to rear of the engine. The engine is designed to have a high by-pass ratio of the order of 2 or 3:1. The by-pass compressor has a rotor 41 carrying three rows of compressor rotor blades 42 and enclosed by a cylindrical stator casing 43 carrying internally rows of compressor stator blades 44 co-operating with the rotor blades. The compressor is connected to discharge into an annular duct defined by a downstream continuation of the stator casing 43 and a coaxial inner wall 45 supported from the stator casing by a number of radially extending streamlined struts 46 symmetrically disposed around the axis of the engine. These struts also carry an annular splitter member 47 which divides the annular duct into an outer annular outlet passage 48 for the by-pass air and an inner annular passage 49 leading to the high pressure compressor.

The high pressure compressor comprises a stator casing 50 connected at its upstream end to the splitter member 47 and carrying internally a number of rows of compressor stator blades 51 co-operating with rows of compressor rotor blades 52 carried by a rotor 53 mounted within the stator casing. In the embodiment described herein the high pressure compressor has fifteen stages.

The high pressure compressor is connected to discharge into a combustion system 54 which may be of any known type. In the present embodiment it comprises an annular air casing consisting of an outer wall 55 connected to the downstream end of the high pressure compressor stator casing 50 and an inner wall 56 supported from the outer wall by the last row of compressor stator blades 57 at its upstream end and by a row of turbine inlet nozzle vanes 58 at its downstream end. The air casing encloses an annular flame tube 59 provided with fuel injectors and flame stabilising means 60 of known type.

The combustion system 54 is connected to discharge through the nozzle vanes 58 into a high pressure turbine comprising a rotor 61 carrying two rows of rotor blades 62 and an enclosing stator casing 63 carrying internally a row of turbine stator blades 64 interposed between the rows of rotor blades. The high pressure turbine rotor 61 is connected to drive the high pressure compressor rotor 53 through a hollow shaft 65 extending through the combustion system 54.

The high pressure turbine discharges through an annular duct 66 defined by an outer wall 67 connected to the high pressure turbine casing 63 and a coaxial inner wall 68 supported from the outer wall by a number of radially extending streamlined struts 69 symmetrically disposed around the axis of the engine. These struts have extensions 70 outwardly of the outer wall of the duct for reasons to be explained below. The duct leads through a row of turbine nozzle vanes 71 into a three-stage low pressure turbine comprising a rotor 72 carrying rows of rotor blades 73 co-operating with rows of stator blades 74 carried by a stator casing 75 connected to the outer wall 67 of the annular duct. The outlet from the turbine is defined by an outer wall 76 connected to the stator casing 75 and a conical exhaust fairing 77 supported from the outer wall by radially extending streamlined struts 78 symmetrically disposed around the engine axis.

The high pressure compressor and turbine rotors are supported from the stationary structure of the plant in bearings 79, 80 respectively at the upstream end of the compressor and the downstream end of the turbine. The low pressure turbine rotor 72 is connected to drive the by-pass compressor rotor 41 through a shaft 81 extending coaxially through the high pressure compressor and turbine, this shaft and the compressor and turbine rotors being supported in bearings 82 downstream of the compressor rotor 41 and bearings 83, 84 respectively upstream and downstream of the turbine rotor 72. Any other known system of bearings could however be used.

The downstream end of the stator casing 43 of the by-pass compressor has an external flange 43a which, when the engine is installed in the aircraft, abuts axially with and is releasably attached to the corresponding flange 31b on the forward extension 31 of the tubular member with which the engine is associated. The rear part of the engine, i.e. the high pressure compressor, combustion system and turbine assembly then extends into the tubular member and is coaxially supported therein by the above-mentioned external strut extensions 70, the outer ends of which engage with the inner wall of the extension 31 but are not otherwise attached thereto. The extension is formed with internal axially extending grooves 31c and the ends of the struts 70 formed with correspondingly shaped feet 70a which can be slid axially along the grooves. The flanges 31b, 43a may be connected by nuts and bolts or the like in known manner, but preferably they are connected by a strap member 90 which encircles the flanges and has an internal circumferential groove in which the flanges engage. The strap member is shown in Figure 11 and includes a semi-circular part 90a which encloses the upper part of the flanges and a number of segmental parts 90b articulated to the ends of the semi-circular part, the free ends of these parts being formed with connections 90c whereby they can be drawn together around the lower part of the flanges as indicated in broken lines.

The rear part of the engine is enclosed by a thin cylindrical shell or casing 91 which is of smaller diameter than the stator casing 43 and the extension 31 and defines with the latter a straight annular passage for the by-pass air. Within the tubular member there is a liner 92 spaced from the inner wall of the extension 31 and tube 24 by spacers 93 and defining therewith an open-ended annular passage 94 extending from a position just downstream of the struts 70 and upstream of the outlet of the low-pressure turbine to the rearward end of tube 24.

The inlet to the engine is defined by the nacelle 10 enclosing the forward part of the engine 9 and the extension 31, and a central fairing 8 secured to the rotor 41 of the by-pass compressor to rotate therewith. The nacelle 10 is such that it can be removed bodily to expose the engine as shown in Figure 4; alternatively it may be formed in segments which can be folded back petalwise in known manner. With the nacelle removed, the connections on the strap 90 can be released and the articulated parts swung aside so that the strap can be removed to release the engine. The engine can then be simply withdrawn axially from the extension 31 as shown in Figure 4.

In a modification, the nacelle 10 is attached to or forms part of the engine assembly and can be removed therewith. Such a nacelle may include a variable area air intake for the engine.

The detailed design of the engine may of course be varied, e.g. it may have different numbers of compressor and turbine stages. The rear supporting struts 70 may be attached to other parts of the stationary structure of the rear part of the engine. For example, the annular duct 66 between the high and low pressure turbines might be omitted and the supporting struts 70 formed by outward extensions of the struts 78 supporting the conical exhaust fairing 77.

Alternative forms of by-pass gas turbine engine might be used. Thus in one variant the engine has a single turbine rotor driving the high pressure compressor rotor direct and the by-pass compressor rotor through reduction gearing in known manner. In yet another variant there might be two mechanically independent turbine rotors, one driving the high pressure compressor rotor direct and the other driving the by-pass compressor rotor through reduction gearing.

At its rearward the tube 24 has a flange 24a abutting with and connected to a corresponding flange 101a on the forward end of a jet pipe unit 101. This is shaped to progressively change in cross-section from circular at its forward end to terminate in a long shallow rearwardly directed jet nozzle 102 extending spanwise of the wing (see Figures 2 and 7). The jet pipes and nozzles are shaped so that the nozzles are contiguous at their edges and together extend as nearly as possible from root to tip of the wing and in any case along a major part of the wing span. The maximum overall spanwise extent of the nozzles is partly determined by structural considerations. Thus as mentioned above, the inboard tubular members are entirely buried in the wing except where enclosed by the engine nacelles but it is necessary to provide fairings on the wing surface to accommodate some of the outboard tubular members where the wing thickness is reduced. The most outboard tubular member is mounted as close as possible to the wing tip while avoiding the necessity for fairings which would give rise to excessive drag and the position of this tubular member determines how closely the jet nozzles can approach the wing tip. The jet pipes and nozzles of the outboard engines can be offset to some extent in an outboard sense relative to the tubular members so as to increase the overall span of the nozzles. In the described embodiment the nozzles 102 together extend along a little more than 80% of the wing span from the root end.

Of course in some embodiments of the invention it may be preferred to restrict the overall span of the nozzles, for example, so that all the tubular members are buried in the wing.

In operation each engine draws in air through its intake and discharges air through the annular by-pass passage and exhaust gases from the turbine outlet, the air and exhaust gases gradually mixing as they flow through the tube 24 and jet pipe 101 and finally being discharged through the jet nozzle 102 as a propulsive jet stream. The overall spanwise extent of the jet nozzles 102 in each wing corresponds to the spanwise extent of the trailing edge wing flap 7 (see Figure 2). As shown in Figure 7 the nozzles 102 are arranged to discharge the jet streams rearwardly as a long thin continuous spanwise-extending sheet over the upper surface of the flap 7 which is movable to deflect the jet sheet upwardly and downwardly from the rearward direction. As explained in the above-mentioned patent, the jet sheet when deflected downwardly interacts with the main stream flow over the aircraft wing, in such a way as to modify the aerodynamic pressure distribution and substantially increase the lift, the magnitude of which can be varied by varying the setting of the flap. The flap may be mounted on a pivot in the manner described and illustrated in said British Patents Nos. 787,012–5, but preferably it is mounted to turn about an axis below the wing. Thus the flap may be mounted in guides so that it turns about a virtual axis in the manner described and illustrated in said British Patent No. 787,011, but in the present embodiment it is mounted on pivots 103 carried by brackets 104 projecting from the lower surface of the wing. The flap is operable in conventional manner by a hydraulic jack 105.

The flap 7 serves to deflect jet sheet downwardly by what is known as Coanda effect. The flap size depends in part on the depth of the jet nozzle 102 in that the radius of curvature of the forward curved upper surface of the flap 7 must be so related to the nozzle depth as to effect the required deflection. The relation can be varied to some extent but the ratio of flap radius of curvature to nozzle depth is not likely to need to be more than five. Thus in practice the flap chord at any point along the span is quite small, say, 2 to 5% and in any case no more than 10 or at the most 15% of the total wing chord. The nozzle depth increases along the wing span generally in proportion to the wing chord and as shown in Figure 2, the span of the individual nozzles and the spacing of the tubular members increases outwardly so that the area of each nozzle is the same. The flap chord may decrease outwardly in proportion to the nozzle depth.

The flaps 7 in opposite wings may be operable to deflect the two jets sheets upwardly and downwardly either together or differentially. Provision may also be made for moving the flaps together through a relatively large range of angular movement and for effecting small movements of the flaps about any position within the larger range either together or differentially independently of the large movements. Also the flaps in each wing may be divided spanwise as shown in Figure 2 into a number of adjacent sections which can be set at an angle to one another to increase drag for reducing the forward speed of the aircraft. Mechanism for effecting all these movements of the flaps is described and illustrated in co-pending United States patent application Serial No. 609,450, filed September 12, 1956, in name of the present applicant.

The spaces 15 within the wing defined by the first to the fifth and the sixth to the ninth tubular members numbering from the fuselage and their fins 28, the front and rear spars 21, 22 and the upper and lower skins of the wing 29, 30 are sealed and constitute integral fuel tanks. As mentioned above the engine by-pass ratio is high and so the gas temperature in the tubular members is comparatively low and should not exceed about 200°

C. even at the rearward end where the by-pass air and exhaust gas streams are fully mixed. This relatively low temperature makes it possible for the tubular members to serve as stress-carrying members of the wing as well as forming gas flow ducts for the jet streams. Moreover, it is not necessary to make the tubular members of special heat resistant materials and the temperature is low enough to allow the tubes to form parts of the walls of the fuel tanks. The spaces between the ninth to the thirteenth tubular members accommodate separately formed fuel tanks such as that indicated at 16. Additional fuel may be carried in the wings outboard of the tubular members, e.g. in the space 18 between the projecting outboard ends of the spars 21, 22.

To ensure that the temperature of the tubular members remains low each is provided with the above-mentioned thin unstressed unperforated liner 92 made of a heat resistant material. Since this liner extends from a point upstream of the outlet of the turbines, only air from the bypass compressor can enter the annular passage 94 and so a layer of cool air is maintained against the inner wall of the tubular member. This layer moreover protects the wall in the event of combustion taking place in the tubular member downstream of the engine, due, for example, to a wet start.

The liner is located axially at one axial position only, say, by welding the upstream row of spacers 93 to the tube 24, and is otherwise free to expand axially, the remaining spacers engaging with but being unattached to the tube 24.

As a further precaution a ventilating air flow is caused to pass through the annular spaces 27 between the sleeves 25 and tubes 24. The spaces may thus be connected at their upstream ends to receive air from small forwardly facing ram air inlets, say, in the wing leading edge, and to discharge the air through drain openings in the wing undersurface. Thus any fuel leaking into the spaces 27 will be carried away by the air flow. The spaces around the fuel tanks 16 may be ventilated in a like manner.

In some cases either the liner 92 or the sleeve 25 may be omitted.

It will be noted that the tubular members with their extensions 31 containing the engines and the shells 91 enclosing the rear parts of the engines are straight substantially uninterrupted cylinders throughout their lengths. Moreover the stator casings 43 of the by-pass compressors are cylindrical and of the same internal diameter as the tubular members. In this way frictional losses in the jet streams are minimized.

The extensions 31 project forwardly of the front spar 21 to such an extent that the rear ends of the engines and hence the compressor and turbine rotors are forward of the spar. This arrangement reduces the risk of a fuel tank being punctured by, for example, a blade becoming detached from a compressor or turbine rotor during operation. If however, the engines are suitably armoured they may however extend to the rear of the front spar into the region surrounded by the fuel tanks.

To allow for flexing of the aircraft wing, a resilient ring member may be interposed between the abutting flanges 43a, 31b on each engine and extension 31. In addition or alternatively each of the rear supporting struts 70 of the engines may be constructed to permit a small amount of relative movement between the engine and the enclosing tubular member. Thus each strut may include an inner and an outer part connected by a damping arrangement which will allow for variations in the length of the strut due to relative movements of the wing and engine due to wing flexing and the like, but will prevent any such variations taking place due to engine vibrations at high rotational speeds. Yet another possibility is to provide resilient pads between the feet 70a of the struts and the extension wall.

At one position along the wing span, adjacent tubular members, in the described embodiment, the fifth and sixth numbering from the fuselage, are more widely spaced than the remainder, the intervening space having therein an undercarriage bay 17. The jet pipes on each side of this position are offset towards one another as shown in Figure 2 so that they touch at their edges and the jet sheet is continuous along the wing span.

As shown in Figure 7, the upper edge of each jet nozzle is defined by a flap member 106 which may be moved by means of a hydraulic jack 107 to increase the jet nozzle area when required, e.g. on starting and for varying the engine thrust for control and trimming purposes. Means may also be provided for reducing the area of the annular by-pass passage for control purposes; such means may comprise flaps normally flush with the shell 91 enclosing the rear part of the engine but movable to a position partly blocking the by-pass passage when required.

In an alternative construction of the wing each tube 24 may abut at its ends with the sleeves 21c, 22c in the front and rear spars, the jet nozzle unit 101 being connected directly to the rear end of the rear sleeve 22c.

There may in any case be further intermediate spars between the front and rear spars.

Each engine 9 preferably has its own self-contained lubricating system, but the other auxiliary services are provided from a source common to all or a group of the engines. Thus each engine has fuel and ignition lines extending from readily disengageable connections on the outer wall of the stator casing 43 of the by-pass compressor through the struts 46 to the interior of the splitter member 47 and thence between the stator 50 of the high pressure compressor and the enclosing shell 91 to the combustion system 54. There may also be a line leading to nozzles for directing compressed air on to some of the compressor or turbine blades, e.g. the first row of rotor blades 62 of the high pressure turbine, for starting, and control lines for any rows of angularly adjustable blades and for the flaps for varying the by-pass passage area (if provided). There is also a line whereby compressed air can be bled off from the high pressure compressor or possibly the by-pass compressor of each engine and led to a manifold common to all or a group of the engines. Compressed air from this manifold is led to drive one or more air turbines which drive the common auxiliaries such as the fuel pump or pumps. All these lines have quick release connections to the lines installed on the aircraft structure so that they can be readily disconnected on removal of the engine. The lines in the aircraft structure are conveniently led along the rear of the front spar out of the plane of the rotors of the engines.

A small number of the engines, say, one or two in each wing, are provided with individual starters of conventional type, e.g. cartridge starters. Each starter drives its engine through a starting shaft 85 extending through the struts 46 at the by-pass compressor outlet and geared through bevel gearing 86 to the forward end of the high pressure compressor rotor 53. The remaining engines are started by the compressed air supplied to the manifold by the engines provided with starters and so all the engines can be started independently of any ground services. However on the ground it may be more convenient to start all the engines by compressed air supplied to the manifold from an external source.

The auxiliaries and their driving turbines may conveniently be located in the bay where the wing passes through the fuselage. The auxiliaries might be driven by an auxiliary engine also serving to start the main propulsion engines.

The fuel supply lines of the engines are grouped so that the engines are controlled all together or in groups rather than individually. There will however be a separate fuel shut-off cock for each engine.

In the above described embodiment, the diameter of the inboard tubular members is less than the wing depth, and they are accordingly provided with external fins to form complete ribs. In some designs of aircraft e.g. for supersonic flight, however, in which the wing thickness is small they may occupy substantially the whole of the thickness of the wing (as shown in Figure 9) and no fins will be required. Moreover, in some embodiments adjacent tubular members may be actually touching or integrally formed with one another.

The engines might drive propellers, the slip stream from which extends along a major part of the wing span to at least the same extent as the jet sheet as described and illustrated in copending United States patent application Serial No. 609,437, filed September 12, 1956, in the names of the present applicant and B. S. Stratford.

The aircraft itself may be in accordance with British Patent No. 790,193 with a tailplane volume which is such that the neutral point is to the rear of the mid-chord point of the wing.

Provision might also be made for discharging relatively small quantities of air from the common manifold through a small auxiliary nozzle extending along the wing span between the jet nozzles 102 and the upper surface of the flap 7 as described and illustrated in British Patents Nos. 787,012, 787,014 and 787,015.

Engines of types other than those described may be used. Thus the engines may be simple or compound turbo-jets, ducted fan gas turbine engines, ram jets or turbo-rocket engines. Examples of turbo-rocket engines are disclosed in British Patent No. 749,009.

The invention has been described above as applied to a jet flap aircraft but it might have application to a more conventional jet propelled aircraft in which the jet streams are discharged through conventional jet nozzles at the rear of the tubes. In such an embodiment there would be a smaller number of somewhat larger engines, the tubular members accordingly being of somewhat larger diameter.

I claim:

1. An aircraft having a wing comprising stress-carrying structure including a front spar and a rear spar extending spanwise of the wing, a plurality of straight tubular members arranged side by side along the wing span and extending chordwise of the wing from a position forward of the front spar through the spars to a position rearward of the rear spar and means rigidly attaching the tubular members to the spars; a cylindrical member radially spaced from each of said tubular members and coaxially mounted relative thereto; rearwardly directed jet nozzle units connected to the rearward ends of the tubular members; and at least one jet engine mounted forwardly of the front spar and connected to discharge a propulsive jet stream through the tubular members and jet nozzle units.

2. An aircraft according to claim 1 further comprising upper and lower skins of the wing rigidly connected to the spars and to the tubular members.

3. An aircraft according to claim 1 wherein said engine is a gas turbine jet propulsion engine.

4. An aircraft having a wing comprising stress-carrying structure including a front spar and a rear spar extending spanwise of the wing, a plurality of straight tubular members arranged side by side along the wing span and extending chordwise of the wing from a position forward of the front spar to a position rearward of the rear spar, and means rigidly attaching the tubular members to the spars, the part of each tubular member between the spars having an inner and an outer wall defining between them an annular space; upper and lower skins of the wing rigidly connected to the spars and to the tubular members; rearwardly directed jet nozzle units connected to the rearward ends of the tubular members; at least one jet engine mounted forwardly of the front spar and connected to discharge a propulsive jet stream through the tubular members and jet nozzle units; fuel tank means in the space defined by the two spars, the upper and lower skins of the wing and two adjacent tubular members; and means for effecting a flow of air through said annular space between said inner and outer walls.

5. An aircraft having a wing comprising stress-carrying structure including a front and a rear spar extending spanwise of the wing, a plurality of straight tubular members arranged side by side along the wing span and extending chordwise of the wing from a position forward of the front spar to a position rearward of the rear spar, and means rigidly attaching the tubular members to the spars; upper and lower skins of the wing rigidly connected to the spars and to the tubular members; rearwardly directed jet nozzle units connected to the rearward end of the tubular members; a gas turbine jet propulsion engine of the by-pass type for each tubular member, each engine comprising a by-pass compressor having a stator casing abutting axially at its rearward end with the forward end of its tubular member, a rearward part including a high pressure compressor, combustion system and turbine assembly extending coaxially within said tubular member, and a casing of smaller diameter than the stator casing enclosing said rearward part of the engine, defining with the tubular member an annular by-pass passage and being formed at its downstream end with an outlet from the turbine assembly into said tubular member, the forward end of said smaller casing defining with the rearward end of said stator casing an annular outlet into said by-pass passage; and means releasably connecting the rearward end of each stator casing to the forward end of the tubular member.

6. An aircraft according to claim 5 wherein each said engine has struts extending radially from said rearward part, and each tubular member is formed internally with grooves extending axially from the forward end thereof, said struts having outer ends engaging in and slidable along said grooves.

7. An aircraft according to claim 5 further comprising a liner within each tubular member defining therewith an open-ended annular passage, the upstream end of said liner lying within said annular by-pass passage.

8. An aircraft according to claim 5 wherein said by-pass compressor, high pressure compressor and turbine assembly comprise rotors located forwardly of the front spar.

9. An aircraft having a wing comprising stress-carrying structure including a front spar and a rear spar extending spanwise of the wing, a plurality of straight circular-section tubular members arranged side-by-side along the wing span and each extending chordwise of the wing from a position forward of the front spar to a position rearward of the rear spar, and means rigidly attaching the tubular members to the spars; upper and lower skins of the wing rigidly connected to the spars and to the tubular members; rearwardly directed jet nozzle units connected to the rearward ends of the tubular members; a plurality of jet engines mounted forwardly of the front spar, distributed along the wing span, and connected to discharge propulsive jet streams through the tubular members and jet nozzle units, said jet nozzle units being shaped and directed so that said jet streams are discharged therefrom in a rearward direction as a long thin jet sheet extending spanwise along the rear of the wing; a jet deflector at the rear of the wing operable to deflect the jet sheet downwardly from the rearward direction; and fuel tank means in the spaces defined by the two spars, the upper and lower skins of the wing and adjacent tubular members.

10. An aircraft according to claim 9 wherein each said engine is a gas turbine jet propulsion engine of the by-pass type.

11. An aircraft having a wing comprising stress-carrying structure including a front spar and a rear spar extending spanwise of the wing, a plurality of straight tubular members, each of constant circular cross-section throughout its length, arranged side by side along the wing span and extending chordwise of the wing from a position forward of the front spar through the spars to a position rearward of the rear spar, and means rigidly attaching the tubular members to the spars; rearwardly directed jet nozzle units connected to the rearward ends of the tubular members; and at least one jet engine mounted forwardly of the front spar and connected to discharge a propulsive jet stream through the tubular members and jet nozzle units.

12. An aircraft having a wing comprising stress-carrying structure including a front spar and a rear spar extending spanwise of the wing, a plurality of straight tubular members arranged side by side along the wing span and extending chordwise of the wing from a position forward of the front spar through the spars to a position rearward of the rear spar, and means rigidly attaching the tubular members to the spars; rearwardly directed jet nozzle units connected to the rearward ends of the tubular members; a plurality of jet engines mounted forwardly of the front spars; said engines being equal in number to the number of tubular members and each engine being connected to discharge a propulsive jet stream through a separate one of said tubular members; and means releasably connecting each engine to the forward end of the associated tubular member.

References Cited in the file of this patent

UNITED STATES PATENTS

| | | |
|---|---|---|
| 1,816,130 | Sikorsky | July 28, 1931 |
| 1,835,370 | Bellanca | Dec. 8, 1931 |
| 2,178,819 | Timm | Nov. 7, 1939 |
| 2,372,250 | Burnelli | Mar. 27, 1945 |
| 2,466,602 | Lombard et al. | Apr. 5, 1949 |
| 2,604,276 | Huben | July 22, 1952 |

FOREIGN PATENTS

| | | |
|---|---|---|
| 55,382 | France | Jan. 9, 1952 |